June 8, 1965 S. H. YUNGUL 3,188,558
TELLURIC SOUNDING METHOD IN WHICH RECORDED VARIATIONS IN THE
TELLURIC FIELD WITH TIME ARE CONVERTED INTO
AMPLITUDE-VERSUS-FREQUENCY SPECTRA
Filed Dec. 6, 1961 3 Sheets-Sheet 2

INVENTOR
SULHI YUNGUL
BY
ATTORNEYS

June 8, 1965 S. H. YUNGUL 3,188,558
TELLURIC SOUNDING METHOD IN WHICH RECORDED VARIATIONS IN THE
TELLURIC FIELD WITH TIME ARE CONVERTED INTO
AMPLITUDE-VERSUS-FREQUENCY SPECTRA
Filed Dec. 6, 1961 3 Sheets-Sheet 3

BASE STATION RESISTIVITY LOG

SOUNDING STATION RELATION BETWEEN RESISTIVITY AND DEPTH

INVENTOR
SULHI YUNGUL
BY
ATTORNEYS

3,188,558
TELLURIC SOUNDING METHOD IN WHICH RECORDED VARIATIONS IN THE TELLURIC FIELD WITH TIME ARE CONVERTED INTO AMPLITUDE-VERSUS-FREQUENCY SPECTRA
Sulhi H. Yungul, College Station, Tex., assignor to California Research Corporation, San Francisco, Calif., a corporation of Delaware
Filed Dec. 6, 1961, Ser. No. 157,391
4 Claims. (Cl. 324—1)

This invention pertains to the art of geophysical prospecting, and, more particularly, to the art of geophysical prospecting that makes use of measurements of the natural electric and magnetic fields existing in and near the surface of the earth. The method is perhaps related most closely to a previous method described by L. Cagniard in U.S. Patent No. 2,677,801, issued May 4, 1954, for Geophysical Exploration Method. The general object of the Cagniard method, as well as of the present method, is to determine one or more electric characteristics of the subsurface earth. In the present method, the specific object is to determine how the electrical resistivity of the earth varies with depth.

Among the prior methods of determining earth resistivity variation, perhaps the simplest in theory was one in which large man-made currents were injected into the earth between widely spaced electrodes and the resistivity of the earth between the electrodes was determined directly from the voltage drop. Currents of varying frequencies could be injected at the electrodes and the variation in apparent resistivity with frequency could be interpreted to give the variation of earth's resistivity with depth. The previously mentioned Cagniard method of U.S. Patent No. 2,677,801 has the advantage over that prior method that no current is required to be injected into the earth. In the Cagniard method, measurements are made of natural potential fluctuations in the earth and natural magnetic field fluctuations at the surface of the earth. The method takes advantage of natural telluric currents that are believed to be caused by electromagnetic phenomena of ionospheric origin. The Cagniard method is theoretically sound and under some circumstances very useful, but, in that it requires an accurate measurement of magnetic fields, it suffers in general applicability because, at the present time, there does not exist a sensitive enough magnetometer to make the required magnetic field measurements under a wide enough variety of circumstances. The method of the present invention reaches some of the objectives of the Cagniard method without the use of a magnetometer. This method requires only a simultaneous recording of the telluric electric field at at least two stations. The additional datum that it requires, which was not required in the Cagniard method, is a resistivity log or some equivalent information at one of the stations where the electrical field is measured. That station, called the base station, can be chosen near a drill hole so that a resistivity log of the drilled hole may be taken as a base resistivity log.

Alternatively, it is possible if there is no drill hole log, to perform the old, more cumbersome, resistivity sounding method at just one location and thereby develop a derived resistivity log for that location, and then to use the herein-described method in turn to derive resistivity-versus-depth information in the surrounding area.

The method of Cagniard is described in U.S. Patent No. 2,677,801 and the basic theory of the method is set forth more comprehensively in an article by Cagniard in Geophysics XVIII (1953), pp. 605–635, entitled "Basic Theory of the Magneto Telluric Method of Geophysical Prospecting." In that article, Cagniard derives a formula (p. 610):

$$\rho = 0.2 T \left(\frac{E}{H}\right)^2 \quad (1)$$

where $\rho$ = the earth resistivity in ohm-meters;
$E$ = the electric field in millivolts per kilometer;
$H$ = the magnetic field in gammas, measured perpendicular to E; and
$T$ = the period of the measured field variation in seconds.

It is found that the apparent resistivity of the earth varies with the period of the fields being measured. This is the result of the natural fact that longer period currents penetrate deeper into the earth and relatively more of those lower frequency currents flow in the deeper portions of the earth. In the mentioned paper, Cagniard gives tables showing depths of penetration, in kilometers, for currents of various frequencies, in earths of various resistivities. He also gives tables showing amplitudes of the surface magnetic field vectors and the surface electric field vectors as functions of earth's resistivity and the period.

One way to describe the present invention in terms related to prior methods would be to say that it substitutes knowledge of the subsurface at a reference station for knowledge that in the prior methods came from the magnetic field measurements, so that without those magnetic field measurements the present method can still obtain similar results. It should not be inferred that the method of the present invention is intended as a complete substitute for the previous magneto-telluric method. Indeed it would not serve all of the purposes of the previous method for single station use. However, the present method makes it possible to deduce information not deducible by the previous method in the absence of magnetic field measurements.

It is an object of the present invention to provide a method for deriving knowledge of the earth's electrical resistivity at various depths through measurement and anlysis of telluric electric fields.

It is a further object of the present method to provide a method for deriving knowledge of the earth's electrical resistivity without the use of sensitive magnetic field measurements.

It is a still further object of the present invention to provide a method for deriving knowledge of the earth's electrical resistivity under certain circumstances where the use of prior methods, involving magnetic field measurements, could not be successful because sensitive enough magnetometers do not exist.

These and other objects will become evident in the light of the following description and the appended drawings in which.

Figure 1:
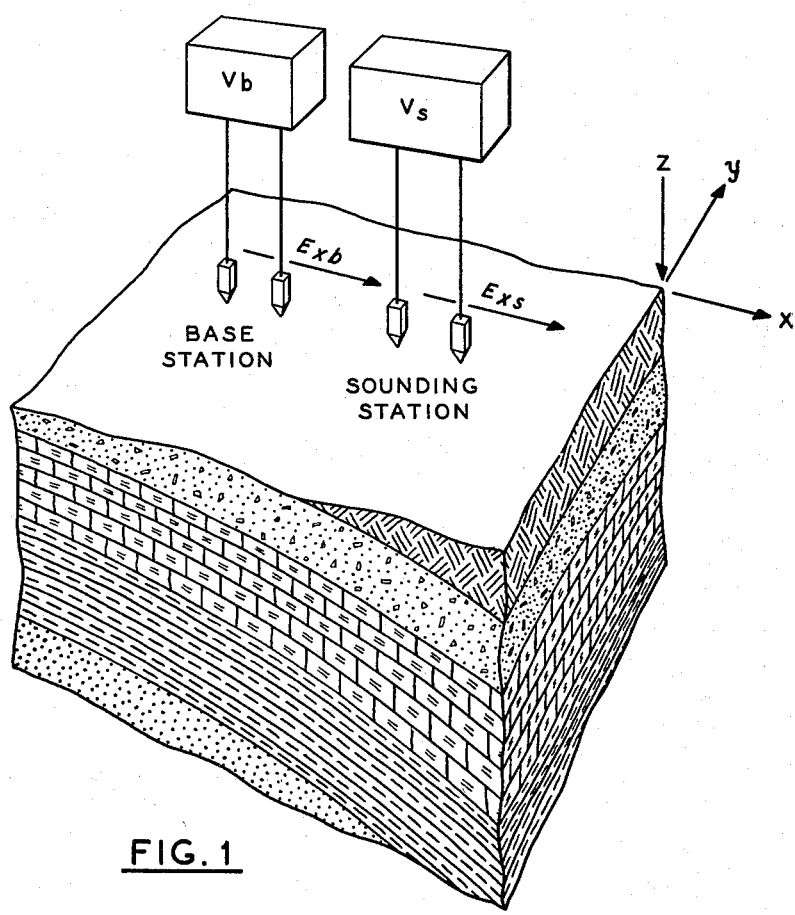
FIGURE 1 is a schematic representation of a portion of earth under electrical investigation.

Referring now to FIGURE 1, in the method of the present invention, the first step is to measure an electrical potential between two points in the earth's surface at a base station, and simultaneously to measure an electrical potential between two points at a sounding station. The purpose of these measurements is to obtain a component of the telluric electric vector at each station. The actual operational procedures involved in making such measurements are well known in the art of electrical prospecting as is evident from the Cagniard U.S. Patent No. 2,677,801. In the present method, it is desirable that the telluric electric component measured at the sounding station be in the same direction as the component measured at the base station. For convenience, we may call that direction the $x$-direction. It is sometimes preferable that the electrodes at the sounding station be placed not only so that they record a component in the same direction as the base station component, but also so that they record the component in the same straight line as the base station component.

The two potentials, one at the base station, the other at the sounding station, are recorded over a given period of time, which may be of the order of 30 minutes. The results of the recording are indicated schematically in FIGURES 2A and 3A. Such figures are known in the art as electric tellurograms.

The recorded voltages are then processed so as to derive their principal frequency components. Several possible processes for deriving these components are known in the art. The voltage-versus-time records can be digitized in an analog-to-digital converter, and the digitized records can be Fourier-analyzed on a digital computer. Or, the voltage-versus-time records can be transformed into an appropriate analog form such as, for example, a magnetic tape record, and the tape record can be played back through a group of electrical filters to give the principal frequency components electrically. As a matter of fact, the original voltage-versus-time recording could be bypassed and recordings of the principal frequency components could be made directly through electrical filters, but the advantage would not usually be great enough to compensate for the loss of the original voltage record, which may serve as a valuable reference on occasion.

The simplest possible kind of Fourier analysis is the mere inspection of records by eye, in which inspection it is sometimes possible to pick out a few fluctuations of rather pure sinusoidal character whose periods can be measured directly off the record. This method was used, for instance, by Niblett and Sayn-Wittgenstein "Variation of Electrical Conductivity with Depth by the Magneto-Telluric Method." Geophysics XXV (1960), pp. 998–1008.

The result of this processing is a record indicating amplitude-versus-frequency spectra of the information recorded in the voltage-versus-time record. The new record will indicate the amplitude of telluric currents having a particular time period of variation or cyclic period. The indicated amplitude peaks of these currents can be said to represent the portion of the current throughout the time duration of the voltage-versus-time record that had any certain selected time period or all of the time periods indicated by the continuous amplitude-versus-frequency spectra. The record may therefore be interpreted to represent the apparent resistivity of the earth at the location where the voltage-versus-time record was made to telluric currents of the particular periods indicated by the record processing.

Figure 2A:
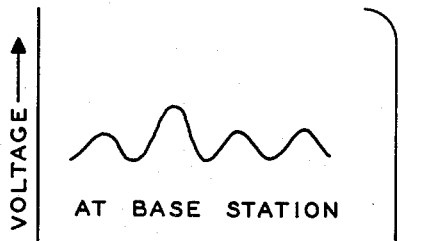
FIGURES 2A and 2B are graphical representations of base station measurements of electrical potential with respect to time and an analysis of principal frequency components due to telluric electric fields.
Figure 2B:
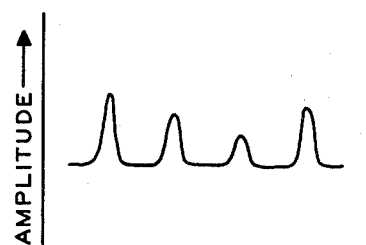
Figure 3A:
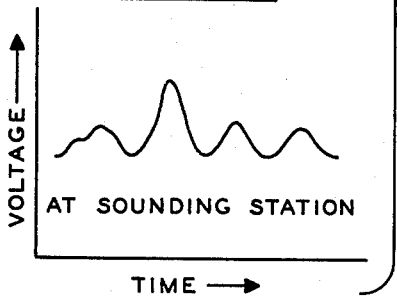
FIGURES 3A and 3B are graphical representations of sounding station measurements of electrical potential with respect to time made simultaneously with the measurements of FIGURES 2A and 2B and an analysis of principal frequency components due to the same telluric electric fields.
Figure 3B:
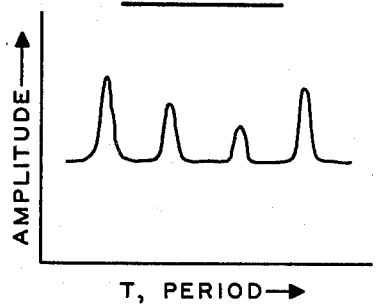
Figure 4:
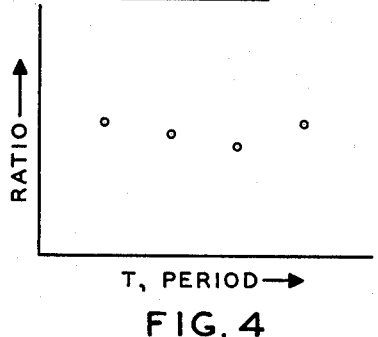
FIGURE 4 is a graphical representation of the ratio of principal frequencies in the graphs of FIGURES 2B and 3B.
Figure 5:
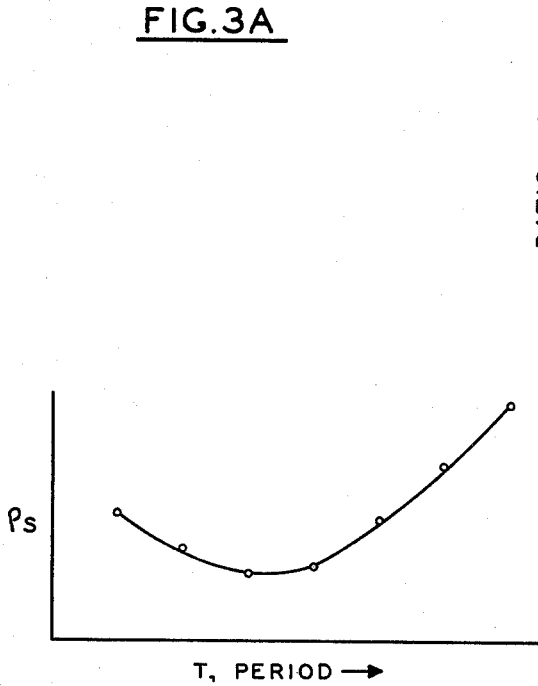
FIGURE 5 is a graphical representation of apparent resistivity with respect to period of fluctuating potential as derived by the method of the present invention.

After the two voltage records represented in FIGURES 2A and 3A have been analyzed to determine their principal frequency components, the results will be as represented schematically in FIGURES 2B and 3B. The next step in the process is to take ratios of the amplitudes of the principal frequency components of the two records, that is, those components that have the same period. FIGURE 4 represents a set of ratios plotted against their respective periods. From these ratios there can be derived a set of apparent resistivity values as represented in FIGURE 5. The manner in which this is done is simple but it is not at all obvious, and it is based upon an unobvious assumption made in the present method, which assumption in turn is based partly on an empirical observation. This observation is that, in the field practice of the previous magneto-telluric method, the magnetic component of the field seemed to vary much less than the electrical component as one moved from station to station, and indeed in many instances showed no significant variation. I believe that there is a fundamental reason for this observed lack of variation and that the conditions under which that lack of variation is likely to be observed may be approximately predicted.

Refer back to FIGURE 1. The configuration of the subsurface sedimentary beds shown in FIGURE 1 is such that the interface depths vary in the $x$-direction, but they do not vary significantly in the other horizontal direction, the $y$-direction. Another way of describing the subsurface shapes is to say that the bed interfacial surfaces could have been generated by a group of straight lines moving always parallel to each other and to their single original direction, the $y$-direction. Or, more briefly, one can say that the subsurface geometry is cylindrical. This cylindrical type of geometry is approximated in many actual geological formations. Its occurrence is common enough to give practical value to assumptions that can be made regarding the expected magnetic field behavior over such a formation.

When the geometry is cylindrical as represented in FIGURE 1, telluric currents, in their tendency to move between bed interfaces will tend to dip (or rise) so that the $x$-component of the current at any particular depth may tend to vary. The $y$-component of current evidently has no geometrical reason to tend to vary. However, even the $x$-component of the current will vary only because the vector sum of the $x$-component and the $z$-component changes direction. That vector sum does not change in magnitude. If one were to picture the total current flowing through a rectangular loop composed of a first short horizontal line on the surface, parallel to $y$, a vertical line, parallel to $z$ and extending to a great depth below which no significant telluric current existed, a second short horizontal line at that depth parallel to the first, and a second vertical line back to the first surface horizontal line, one would see that the total telluric current flowing through such a loop would not vary as the loop moved from place to place without changing orientation in a formation such as that represented in FIGURE 1.

Now it can be shown from the laws of electromagnetism that the horizontal magnetic vector along the top of such an imaginary loop is proportional to the total current flowing through the loop. If the total current flowing through such a loop did not vary with position in a region such as represented in FIGURE 1, then neither would the surface horizontal component of the magnetic field vary with position.

The fundamental practical assumption of the present method is that, in the region of interest, the horizontal component of the magnetic field does not vary significantly. I have found that this assumption is justified in many situations of practical interest.

Now, referring back to the previously given formula for the earth resistivity in terms of the electric and magnetic fields, we can make a useful conversion in the light of the above assumption. Let us write two such equations, one for the base station, with two subscripts $b$, and one for the sounding station, with subscripts $s$.

$$\rho_b(T) = 0.2T \left(\frac{E_{xb}}{H_{yb}}\right)^2 \quad (2)$$

and $$\rho_s(T) = 0.2T \left(\frac{E_{xs}}{H_{ys}}\right)^2 \quad (3)$$

If we are dealing with a region of cylindrical geometry over which we can assume that the horizontal component of the magnetic field does not vary significantly, we can write:

$$H_{yb} \cong H_{ys} \quad (4)$$

and finally:

$$\frac{\rho_s(T)}{\rho_b(T)} \cong \left(\frac{E_{xs}}{E_{ys}}\right)^2 = R^2 \quad (5)$$

where the quantity R is, by definition, the ratio of two electrical components, one at the sounding station, and the other at the base station. The above equation is to be interpreted as meaning that the apparent resistivity of the earth at one location, for fluctuating currents of a particular period T, is related to the apparent resistivity of the earth at the other location, for currents of the same period, approximately as the square of the telluric electric component at the first location is related to the square of the telluric electric component at the second location. This in turn means that if we know the amplitude-versus-frequency spectra quantities represented in FIGURES 2B and 3B, particular frequency components of the two voltage records at the base station and the sounding station, we can select frequency components that are common to both the base station and the sounding station, and by merely using the ratios of their amplitudes, represented in FIGURE 4, we can deduce the relationship between the apparent resistivity of the earth and the period of the telluric current at the sounding station, as represented in FIGURE 5. However, we must first have known the corresponding relation for the base station as indicated hereinbefore, and as will now be more fully described.

The description up to this point has covered the physical steps of the method of the present invention. The physical quantities to be measured have been designated, and the reasons have been indicated why those quantities need to be measured and why the magnetic field does not need to be measured as it was in previously known methods. Now, in order to explain the final processing of the data, it is convenient to return to the consideration of what data were presumed to be given or known at the beginning of the method and how those data are to be converted into what is desired as the final result.

Figure 6:
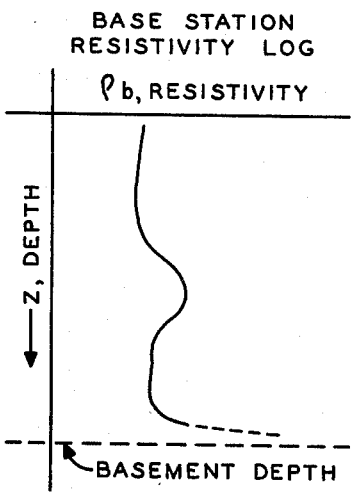
FIGURE 6 is a typical resistivity log of an earth formation as derived from within a well bore penetrating the formation.

Refer now to FIGURE 3. It is presumed in this method that we are given the resistivity-versus-depth relationship for the base station location. This is represented in FIGURE 6. This relationship may be known directly from an electrical resistivity well log made in a drilled well near the base station. Less desirably, in case a well log is not available, the resistivity-versus-depth information may be obtained from a resistivity sounding by the artificially-injected-current method. It could be obtained from a magneto-telluric sounding at the base station using the method of Cagniard, in which reliable magnetometric measurements are required, at least at the base station. Sometimes it is possible that magnetometric measurements can be conveniently made at one station, and not at others.

Figure 7:
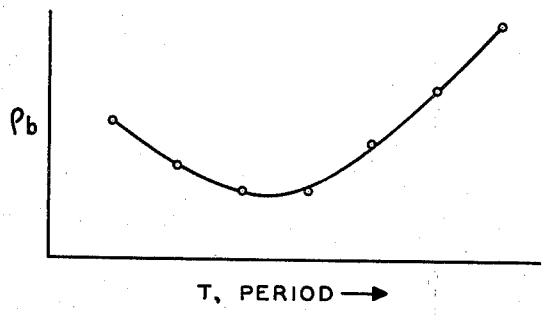
FIGURE 7 is a graphical representation of apparent resistivity with respect to period of fluctuating potential for the formation logged in FIGURE 6.
Figure 8:
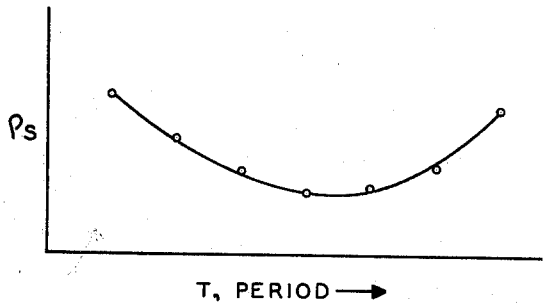
FIGURE 8 is a graphical representation of apparent resistivity similar to FIGURE 7 derived from measurements of the type illustrated in FIGURES 2 to 5.

By whatever means the relationship between resistivity and depth is obtained, for use in the present method it is converted into a relationship between apparent resistivity $\rho_b(T)$ (as measured at the surface) and period, T. See FIGURE 7. This calculational conversion is made as described in the previously cited article of Cagniard. Next, the derived relationship for apparent resistivity at the base station is converted into a relationship for apparent resistivity at the sounding station, merely by multiplying each ordinate by the square of the ratio R as indicated hereinbefore, i.e., solve Equation 5 for $\rho_s(T)$. See FIGURE 8.

Figure 9:
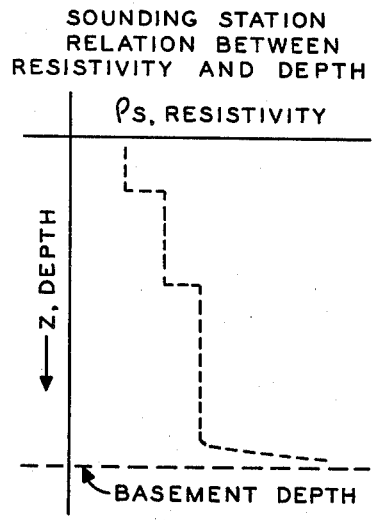
FIGURE 9 is a derived resistivity log of an earth formation as derived from an analysis of the graph of FIGURE 8.

There remains then only the final step of converting the apparent resistivity-versus-period curve for the sounding station into a resistivity-versus-depth curve for the sounding station. This is the reverse of what was done with the resistivity data from the base station. The reverse process is not as easy as the forward process, but it is well known to those skilled in the art of magneto-telluric sounding, as taught for instance in the cited article of Cagniard. Essentially, it consists of matching the derived curve of apparent resistivity versus period, i.e. $\rho_s(T)$, with one of a group of master curves such as those in the cited Cagniard article (ibid. pp. 622–629), using techniques described therein or other available master curves. Other curves for more complicated cases appear in an article by Tikhonov, Akademia Nauk, USSR, Izvestiia Seriia Geofizicheskaia, No. 4, p. 410–418 and in an article by the present inventor: S. H. Yungul, "Magneto-Telluric Sounding Three-Layer Interpretation Curves." Geophysics XXVI, 465 (1961). The most closely matched curve indicates the proper type of resistivity variation with depth. The final result is a curve (or a set of numerical data) showing the variation with depth of the electrical resistivity of the subsurface formations at the sounding station. This result is represented in FIGURE 9.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:
1. A method of geophysical prospecting in which an approximate determination is made of the variation with depth of the electrical resistivity of the subsurface formations at a sounding station having a positional relation to a base station where the variation with depth of the electrical resistivity of the subsurface formations is known comprising:
   (a) recording over a given period of time potential-versus-time curves of at least one component of the electric telluric field at a base station,
   (b) recording over said given period of time potential-versus-time curves of the component in the same direction of the electric telluric field at a sounding station,
   (c) Fourier-analyzing the corresponding recorded potential-versus-time curves for the base station and the sounding station into amplitude-versus-frequency spectra records representing by peaks within said records the amplitude of the electric telluric field of selectable cyclic periods at said base station and said sounding station,
   (d) selecting peaks representing the same frequencies from both said base station and said sounding station amplitude-versus-frequency spectra record,
   (e) determining the between-record ratios of said selected peaks,
   (f) and determining from said ratios the variation with depth of the electrical resistivity of the subsurface formations at said sounding station.

2. The method of claim 1 wherein the determined ratios of corresponding spectral peaks are converted to apparent resistivity variations-versus-frequency curves for said sounding station and the variation with depth of the electrical resistivity of the subsurface formations at said sounding station is determined by comparing said apparent resistivity variations-versus-frequency curves to master curves of apparent resistivity-versus-frequency.

3. In a method for the geophysical exploration of the underground in a given area, the steps of:
   (a) at a first station where the electrical resistivity variation with depth of subsurface formations is known, measuring and recording over a given period of time values representing variations occurring in at least a component of the electric telluric field at said first station,
   (b) over the same given period of time at a second station having a known location with respect to said first station, measuring and recording values representing variations in at least the same component of the telluric electric field at said second station,
   (c) analyzing said recorded values to derive amplitude-versus-frequency spectra at each of said stations during said period of time,
   (d) and comparing selected peaks representing the same frequency in said derived frequency spectra from said first and second stations to relate said known electrical resistivity variation with depth at said first station to predict the electrical resistivity variation with depth at said second station.

4. The method of claim 3 wherein said comparing of derived spectra establishes between-record ratios of corresponding spectral peaks and wherein said ratios are used with said known electrical resistivity variation with depth at said first station to predict the electrical resistivity variation with depth at said second station.

References Cited by the Examiner
UNITED STATES PATENTS

| | | | |
|---|---|---|---|
| 2,240,520 | 5/41 | Schlumberger | 324—1 |
| 2,284,990 | 6/42 | Schlumberger | 324—1 |
| 2,586,667 | 2/52 | Kunetz | 324—1 |
| 2,677,801 | 5/54 | Cagniard | 324—1 |
| 3,009,106 | 11/61 | Haase | 324—77 |

WALTER L. CARLSON, *Primary Examiner.*